June 26, 1962 V. D. DAILEY 3,040,393
VACUUM INSERTABLE STRIP
Filed Aug. 5, 1957
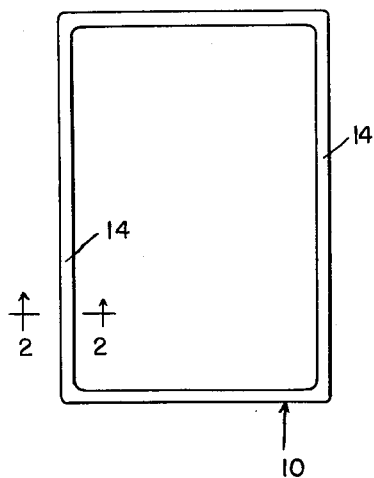
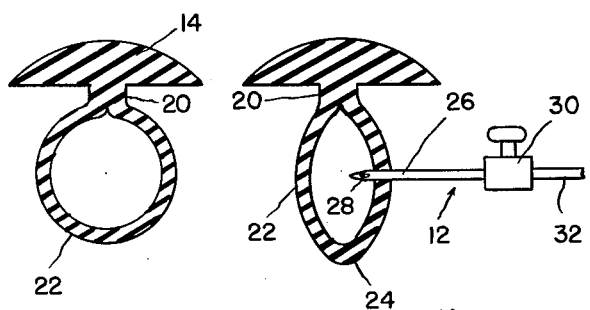
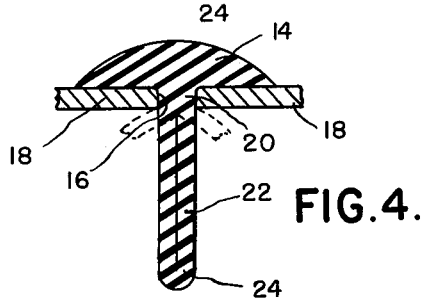
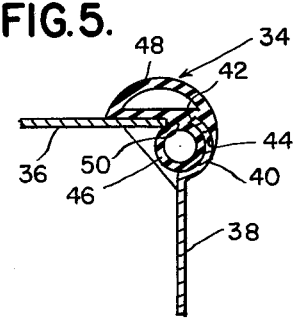
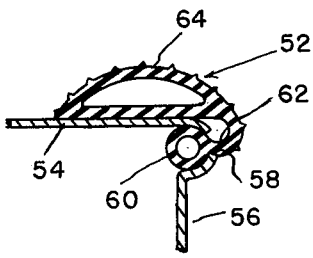
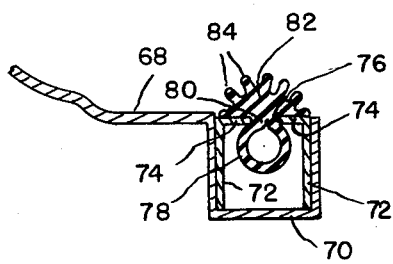
INVENTOR.
VACELL D. DAILEY
BY Whittemore, Hulbert
Belknap
ATTORNEYS 3,040,393
VACUUM INSERTABLE STRIP
Vacell D. Dailey, Waterford, Mich., assignor, by mesne assignments, to Baldwin-Montrose Chemical Company, Incorporated (Baldwin Division), Pontiac, Mich., a corporation of Indiana
Filed Aug. 5, 1957, Ser. No. 676,199
6 Claims. (Cl. 20—69)

The present invention relates to a vacuum insertable strip and more particularly, to a strip formed of yieldable resilient material including a collapsible tubular portion adapted to collapse when evacuated for insertion into an elongated recess or opening in support structure.

This application is a continuation-in-part of my co-pending application, Serial No. 639,243, filed February 11, 1957 and now abandoned. It deals in particular with a further improvement in the various vacuum insertable strip structures disclosed in that application, in accordance with which they are formed in an endless annular or ring-like outline, such as is desirable in embodying the invention in a door or panel sealing device.

It is a general object of the invention to provide an elongated member, in particular a ring of the character described, which is economical to construct, efficient in operation, and which is characterized by the facility with which it may be mounted in operating position.

More specifically, it is an object of the present invention to provide an endless annular, elongated sealing or like member formed of yieldable resilient material and adapted to be mounted on support structure including means defining a narrow elongated opening, also annular in character, the member having provision to control the direction of collapse of the tube when evacuated for insertion in the opening.

It is a further object of the present invention to provide useful articles such for example as self locking filler strips, sealing strips, refrigerator door seals, joining strips, glass mounting channels, water deflector seals, trunk seals or the like, all characterized by the inclusion of elongated collapsible tubular portions having means for controlling the direction of collapse of the tube when evacuated to facilitate insertion of the tubular portion in the opening of the support structure.

Other objects and features of the invention will become apparent as the description proceeds, especially when taken in conjunction with the accompanying drawing, illustrating preferred embodiments of the invention, wherein:

FIGURE 1 is a front elevational view of a ring-like strip of the invention in a simple illustrative adaptation thereof.

FIGURE 2 is a cross sectional view on an enlarged scale of the strip or ring of FIGURE 1, as on line 2—2 of that figure, showing the same with its collapsible tubular portion in an original expanded condition.

FIGURE 3 is a view in section similar to FIGURE 2 but showing the tubular portion in process of being evacuated to collapse the same, as by a hypodermic type evacuating device.

FIGURE 4 is a view in similar section of the collapsed strip as inserted in an aperture or slot of a typical support structure, with a subsequent restored, expanded condition indicated in dotted line.

FIGURE 5 is a transverse sectional view of a sealing strip with associated support structure.

FIGURE 6 is a transverse sectional view through the door seal of a domestic refrigerator, with associated support structure.

FIGURE 7 is a transverse sectional view of an automobile trunk seal with associated support structure.

The present invention may be embodied in sealing strips and the like capable of a multiplicity of divergent uses. There is herein illustrated a number of such uses, and many others will occur to those skilled in the art.

FIGURES 1-4 illustrate a simple embodiment of the invention in a hollow annular or ring-like sealing strip 10, such as is commonly employed in association with a refrigerator door or door frame, a window or related type of panel or its frame, or, in fact, any endless sealing or ornamental device having a similar function. It is evident that, in an annular formation of this sort, special provisions for evacuating and thereby collapsing the hollow portion of such a strip must be employed; and the reference numeral 12 in FIGURE 3 generally designates a hypodermic needle type of device, hereinafter further described, for the purpose.

The strip or ring 10 shown in FIGURE 1 is formed conventionally from a yieldable resilient material such as rubber, synthetic rubber or other suitable elastomeric plastic material, in any desired annular outline, typified in FIGURE 1 as a rectangule. The materials and the shapes in which the strips disclosed herein are formed are selected to facilitate production of endless lengths by extrusion or other known molding method.

Referring to FIGURES 2, 3 and 4, the ring 10 includes a widened head portion 14 adapted, as illustrated in FIGURE 4, to substantially overlap the margins of an annular slot or like aperture 16 formed between adjacent spaced portions 18 of the sealed support structure in question. The head portion 14 extends in opposite lateral directions from a relatively short intermediate neck or flange portion 20, which portion connects the head portion to one end of a collapsible tubular portion 22. An end or flange portion 24 closes the opposite side of the tubular portion 22.

The wall section of the tubular portion 22 is specifically shaped in conjunction with means extending therefrom, such as the portions 20 and 24, to control the direction of collapse of the tubular portion under atmospheric pressure when its interior is evacuated. If the expansion joint has a cross-sectional shape as illustrated in FIGURE 2, it is apparent from inspection that when evacuated the tubular portion 22 will collapse to the shape indicated in FIGURE 4, thus permitting the portions 20 and 24 as well as the collpased tubular portion 22 to be inserted in the slot 16 simply by dropping it in. It will also be apparent from a comparison of FIGURES 2 and 4 that it would be physically impossible to force the strip of FIGURE 2 into the slot in the position illustrated in FIGURE 4 except by collapse of the tubular portion. This, of course, is because frictional opposition to entry of the uncollapsed tubular portion would cause the neck or flange portion 20 to bend before the uncollapsed tubular portion could be fully inserted.

The evacuating device 12 is conventionally shown in FIGURE 3 of the drawings, including a needle end 26 with a terminal evacuating port 28 at its sharpened tip, and a simple hand valve 30 controlling the communication of the needle 20 with the appropriate source of vacuum, as through the tubular line 32. When it is desired to insert the ring in the slot 16, the device 12 is thrust into a side wall of the tubular portion 22 and the valve 30 manipulated to evacuate the interior of the latter.

Tubular portion 22 is shown in FIGURE 3 in an intermediate stage of evacuation and, in FIGURE 4, as fully collapsed for insertion. In the event it is found necessary, it may be desirable to provide for the subsequent application of atmospheric pressure through the device to assist in the restoration of the tubular portion to its original expanded condition (dotted line in FIGURE 4). However, the invention does not deal with refinements of this sort.

With the expansion joint fully collapsed and inserted in slot 16 as illustrated in solid line in FIGURE 4, it will be apparent that when atmospheric pressure is restored to the interior of the tubular portion, its natural resilience will retain the strip in position.

In the insertion of the collapsed strip, the internal evacuation thereof may be preserved during the operation by simply initially inserting the entire length of the strip other than the increment of length penetrated by the hypodermic device, thereby obtaining a major anchoring of the strip in place. The hypodermic device may then be withdrawn, and the previous lodgement in the slot, save for the zone of penetration, will enable this minor zone to be readily thrust in place. In the alternative, the operator's finger may be held over the point of penetration, with the strip in evacuated condition, as it is being inserted, this zone being released as it is pushed into the slot. As a still further expedient, the collapsible portion could be temporarily sealed off by releasable clamps at either side of the point of penetration until the final thrust of the member into the slot.

An important feature of the present invention is the structural design of the tubular portion together with the structure extending along the tubular portion which controls the direction of collapse. Obviously, if the tubular portion 22, as seen in FIGURE 2, collapsed vertically, it would defeat the purpose of the present invention.

In the embodiments of each of FIGURES 5, 6 and 7 the respective strips or sealing members shown are to be considered as constructed in an annular or ring-like outline, like that of FIGURE 1, though individual features appearing in these figures are well suited for applications calling for a strip of finite length.

Referring now to FIGURE 5 there is illustrated a sealing strip or ring 34 adapted to be mounted between spaced edges of panel members 36 and 38. The panel member 38 has a curved edge portion 40 the edge of which is spaced from the adjacent edge of the panel 36 to provide an elongated annular recess, slot or opening 42. The sealing strip or ring 34 is provided with a groove 44 for the reception of the curved edge portion 40 of the panel 38. Adjacent the groove 44 the sealing strip includes an elongated collapsible tubular portion 46. The sealing strip or ring also includes a hollow seal portion 48 connected to the tubular portion 46 by a neck portion 50. When the interior of the tubular portion 46 is evacuated, it collapses substantially horizontally as viewed in FIGURE 5. This serves the dual function of reducing the width of the collapsible tubular portion 46 so that it may be inserted readily through the narrow slot 42 and also serves to temporarily widen the groove 44 so that assembly with the curved edge portion 40 of the panel 38 is facilitated. When the sealing strip is in the position illustrated in FIGURE 5 air is re-admitted to the interior of the collapsible tubular portion, which expands to the position shown, firmly interlocking the strip in position.

Referring now to FIGURE 6 there is illustrated a sealing ring or strip 52 employed as a door seal in a domestic refrigerator including panel parts 54 and 56 the edges of which are spaced to define an elongated annular slot, recess or opening 58. The sealing ring 52 includes a collapsible tubular portion 60, a neck portion 62, and a hollow seal portion 64 adapted to be supported against an outer surface of the panel 54. The collapsible tubular portion 60, when collapsed, flattens substantially vertically as seen in the figure so that it may be readily inserted through the slot 58. At the same time, collapse of the tubular portion 60 enlarges the space between it and the sealing portion 64, thus facilitating entry of the edge portion of the panel 54 between seal portions 60 and 64.

Referring now to FIGURE 7 there is illustrated the application of the present invention to a trunk seal for an automotive vehicle. Surrounding the trunk of the automotive vehicle is panel structure 68 shaped to provide a channel 70. Located in the channel are elongated strips 72 the upper edges of which are turned inwardly to provide flange portions 74 spaced apart to define therebetween an elongated relatively narrow recess, opening or slot 76. The trunk seal comprises the collapsible tubular portion 78 connected by a neck portion 80 to the seal body 82, which in turn is of generally semi-cylindrical cross-sectional shape and is provided with a multiplicity of flexible generally radially extending fins, lips or flanges 84 adapted to be engaged by the trunk lid when closed. The neck portion 80 connected to the tubular portion 78 influences it to collapse horizontally, as seen in this figure, when evacuated, thus facilitating insertion through the relatively narrow opening 76.

The drawing and the foregoing specification constitute a description of the improved vacuum insertable strip in such full, clear, concise and exact terms as to enable any person skilled in the art to practice the invention, the scope of which is indicated by the appended claims.

What I claim as my invention is:

1. An endless annular member of resiliently flexible material insertable in a slot-like opening of a panel-like supporting structure, said member including a portion extending across one side of said opening to seal the same and a tubular collapsible portion integral with said portion which is disposable across the opposite side of said opening to hold said member therein, said tubular collapsible portion having a continuous hollow interior sealed from the exterior of said member throughout the annular length of the latter and being collapsible under internal vacuum in the direction of the plane of said structure so as to permit edgewise insertion in said opening, the transverse dimension of said tubular portion substantially exceeding that of said slot when said portion is expanded, said tubular portion being resiliently flexible outwardly to expanded position under atmospheric pressure internally thereof.

2. An endless annular member of resiliently flexible material insertable in a slot-like opening of a panel-like supporting structure, said member including a portion extending across one side of said opening to seal the same and a tubular collapsible portion integral with said portion which is disposable across the opposite side of said opening to hold said member therein, said tubular collapsible portion having a continuous hollow interior sealed from the exterior of said member throughout the annular length of the latter and being collapsible under internal vacuum in the direction of the plane of said structure so as to permit edgewise insertion in said opening, the transverse dimension of said tubular portion substantially exceeding that of said slot when said portion is expanded, said tubular portion being resiliently flexible outwardly to expanded position under atmospheric pressure internally thereof, said first named portion including a laterally extended sealing element of solid cross section substantially overlying the edges of said opening.

3. An endless annular member of resiliently flexible material insertable in a slot-like opening of a panel-like supporting structure, said member including a portion extending across one side of said opening to seal the same and a tubular collapsible portion integral with said portion which is disposable across the opposite side of said opening to hold said member therein, said tubular collapsible portion having a continuous hollow interior sealed from the exterior of said member throughout the annular length of the latter and being collapsible under internal vacuum in the direction of the plane of said structure so as to permit edgewise insertion in said opening, the transverse dimension of said tubular portion substantially exceeding that of said tubular slot when said portion is expanded, said portion being resiliently flexible outwardly to expanded position under atmospheric pressure internally thereof, said first named portion including a laterally extended sealing element of hollow cross section substantially overlying the edges of said opening.

4. An endless annular member of resiliently flexible material insertable in a slot-like opening of a panel-like supporting structure, said member including a portion extending across one side of said opening to seal the same and a tubular collapsible portion integral with said portion which is disposable across the opposite side of said opening to hold said member therein, said tubular collapsible portion having a continuous hollow interior sealed from the exterior of said member throughout the annular length of the latter and being collapsible under internal vacuum in the direction of the plane of said structure so as to permit edgewise insertion in said opening, the transverse dimension of said tubular portion substantially exceeding that of said slot when said portion is expanded, said tubular portion being resiliently flexible outwardly to expanded position under atmospheric pressure internally thereof, said first named portion including a laterally extended sealing element of solid cross section substantially overlying the edges of said opening, said portion having a plurality of spaced, outwardly extending flange elements engageable with a surface against which said structure is to be sealed.

5. An endless annular member of resiliently flexible material insertable in a slot-like opening of a panel-like supporting structure, said member including a portion extending across one side of said opening to seal the same and a tubular collapsible portion integral with said portion which is disposable across the opposite side of said opening to hold said member therein, said tubular collapsible portion having a continuous hollow interior sealed from the exterior of said member throughout the annular length of the latter and being collapsible under internal vacuum in the direction of the plane of said structure so as to permit edgewise insertion in said opening, the transverse dimension of said tubular portion substantially exceeding that of said slot when said portion is expanded, said tubular portion being resiliently flexible outwardly to expanded position under atmospheric pressure internally thereof, said first named portion including a laterally extended sealing element of hollow cross section substantially overlying the edges of said opening, said first named portion coacting with said tubular portion in defining a slot frictionally receiving an edge of said support structure.

6. A member in accordance with claim 1, in which said first named sealing portion extends substantially over at least one surface of said supporting structure from an edge of said opening.

References Cited in the file of this patent

UNITED STATES PATENTS

| | | |
|---|---|---|
| 513,302 | Canda | Jan. 23, 1894 |
| 2,093,092 | McElhany et al. | Sept. 4, 1937 |
| 2,101,996 | Gerstenberg | Dec. 14, 1937 |
| 2,230,688 | Irwin | Feb. 4, 1941 |
| 2,306,990 | Essl | Dec. 29, 1942 |
| 2,401,923 | Gleeson | June 11, 1946 |
| 2,705,655 | Brown et al. | Apr. 5, 1955 |
| 2,761,536 | Bradley | Sept. 4, 1956 |
| 2,832,614 | Settle | Apr. 29, 1958 |